April 16, 1935. C. A. SKÄRLUND 1,998,392
LUBRICATING MEANS FOR INTERNAL COMBUSTION MOTORS
Filed Oct. 23, 1933

Inventor:
Carl A. Skärlund

Patented Apr. 16, 1935

1,998,392

UNITED STATES PATENT OFFICE 1,998,392

LUBRICATING MEANS FOR INTERNAL COMBUSTION MOTORS

Carl Axel Skärlund, Stockholm, Sweden

Application October 23, 1933, Serial No. 694,907
In Sweden October 26, 1932

15 Claims. (Cl. 184—6)

The present invention relates to a lubricating means for the bearings of internal combustion motors with a vertical shaft and a closed crank casing. The invention refers particularly to such means where the upper crank shaft bearing of the motor communicates with a crank chamber through a closed conduit which may be valve-controlled, if desired, so that the lubricant is forced to the said upper bearing on account of the compression produced in said chamber on every working stroke.

In known means of this type, the lubricating conduit leading to the upper crank shaft bearing has been connected to the lower portion of the crank casing in the proximity of the lower crank shaft bearing, with the result that this latter, bearing would be deprived of lubricant to an extent rendering its lubrication unsatisfactory.

The invention has for its object to ensure an effective lubrication also of the lower crank shaft bearing and of other bearings that may be provided.

The invention consists substantially in the arrangement of an oil collector at a point of the crank chamber situated above the lower crank shaft bearing, said oil collector communicating with the upper crank shaft bearing through the above-mentioned conduit.

Figure 1:
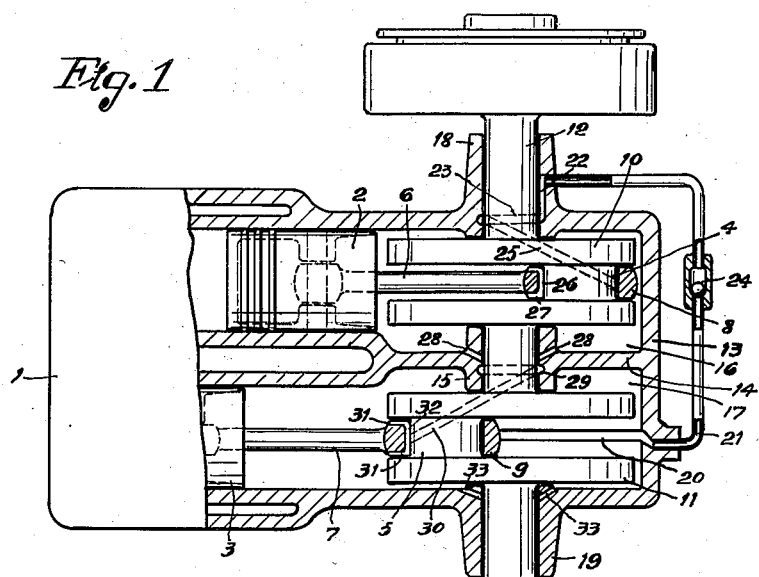
Figure 2:
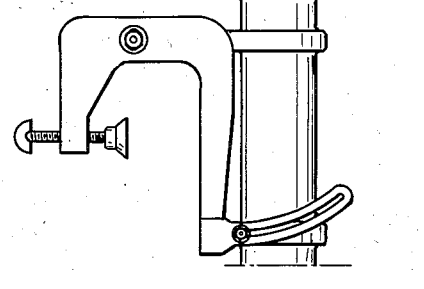
Figure 3:
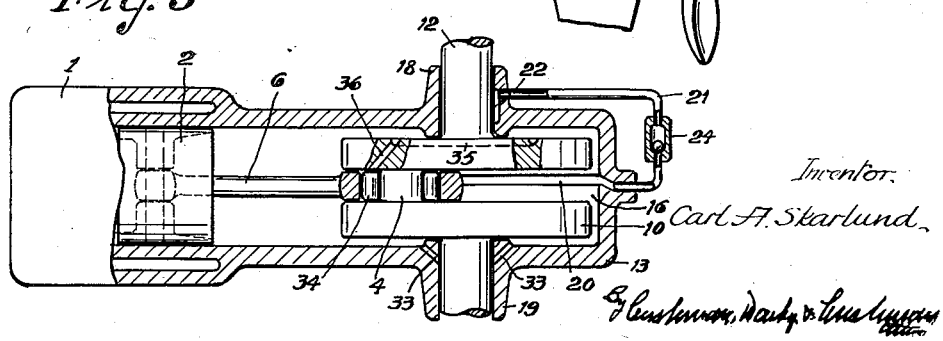

The accompanying drawing illustrates a few embodiments of an arrangement according to this invention. Fig. 1 is an elevation, shown partly in section, of a twin cylinder outboard motor provided with a lubricating means according to the invention. Fig. 2 shows a section of a connecting rod bearing. Fig. 3 is an elevation, shown partly in section, of a single cylinder motor provided with a lubricating means according to a somewhat modified construction.

In the embodiment shown in Figs. 1 and 2, 1 designates the cylinder casing and 2 and 3 the two pistons running therein, said pistons being connected in known manner with their appertaining crank pins 4 and 5 respectively by means of the connecting rods 6, 7 and the connecting rod bearings 8, 9. The cranks 10 and 11 and the appurtenant parts of the crank shaft 12 are enclosed in known manner within the crank casing 13, which is divided, by means of a partition 14 forming a central crank shaft bearing 15, into two chambers 16 and 17 separated from each other. The upper crank shaft bearing is denoted by 18 and the lower one by 19.

Provided at one point of the lower crank chamber 17 situated above the lower crank shaft bearing 19 is a container 20 in the form of a downwardly inclined chute, in which a portion of the lubricating oil supplied to said chamber is collected. Connected to this chute is a conduit 21 communicating with a recess 22 in the upper crank shaft bearing 18, which recess in turn communicates with a channel 23 extending all around in said bearing. Arranged in the conduit 21 is a non-return valve 24 formed as a ball valve.

Provided in the upper portion of the crank shaft 12 and in the appertaining crank 10 and crank pin 4 is a channel 25 directed obliquely downwards, said channel connecting the channel 23 of the upper crank shaft bearing with the upper connecting rod bearing 8. Provided in this bearing is an axially extending channel 26, Fig. 2, which communicates with the appurtenant crank chamber 16 through lateral passages 27 in the bearing. Said channel 26, which must be of a certain width, is so disposed as to be in communication with the mouth of the channel 25 leading from the upper crank shaft bearing, during a portion at least of the suction stroke of the piston 2, when a pressure below atmospheric is produced in the crank chamber 16, or, in other words, during a portion at least of the compression stroke of the other piston 3, when a pressure above atmospheric is produced in the crank chamber 17. The connecting rod bearing 8 with the appertaining channel 26 will then act as a controlling slide which through the conduit 21 brings the upper crank shaft bearing 18 and the upper connecting rod bearing 8 into communication with the lower crank chamber 17 only during the compression period in this chamber or during a portion of said period. On the whole, the said slide device serves the same purpose as the non-return valve 24, so that one of these devices, or both of them, perhaps, may be omitted.

Provided in the partition 14 between the two crank chambers 16 and 17 are channels 28 connecting the lower portion of the upper crank chamber 16 with the central crank shaft bearing 15. Provided in this bearing is a channel 29 extending all around, said channel communicating with the lower connecting rod bearing 9 through a channel 30 formed in the central crank shaft portion, in the lower crank 11, and in the lower crank pin 5. As in the case of the upper connecting rod bearing 8, the connecting rod bearing 9 has provided therein an axially extending channel 32 communicating with the crank chamber 17 through side passages 31, said channel 32 being so disposed as to communicate with the mouth of the channel 30 during the suction stroke of the piston 3, or during the compression stroke of the piston 2, as will be seen from Fig. 1. Finally, the lower portion of the crank chamber 17 is connected with the lower crank shaft bearing 19 through passages 33.

On each working stroke of the lower cylinder piston 3, compression will be produced in the lower crank chamber 17, while a pressure below atmospheric is at the same time produced in the upper crank chamber 16. The lubricant collecting in the container 20 of the lower crank chamber will then be forced up to the upper crank shaft bearing 18 through the conduit 21 on account of the prevailing difference in pressure between the chambers 16 and 17, the said crank shaft bearing 18 being thus efficiently lubricated in an automatic manner. This is also the case with the lower crank shaft bearing 19, which is lubricated by the lubricant collecting in the lower portion of the crank chamber 17, which lubricant cannot be forced up to the upper crank shaft bearing 18 by reason of the fact that the conduit 21 is connected to the container 20 located higher up.

At the compression stroke in question of the lower piston 3 the mouth of the channel 25 is in communication with the channel 26 in the upper connecting rod bearing 8, as stated, with the result that this bearing will also be efficiently lubricated.

The lubricant collecting in the lower portion of the upper crank chamber 16 flows down through the channels 28 to the central crank shaft bearing 15 and lubricates this bearing, whereupon the lubricant, which partly collects in the channel 29, is supplied through the channel 30 to the lower connecting rod bearing 9 as well, particularly on the suction stroke of the piston 3, when the said channel 30 communicates with the channel 32 in said bearing 9, which channel is open toward the chamber 17.

The arrangement disclosed thus ensures that all bearings will be effectively and automatically lubricated.

In the embodiment according to Fig. 3, which shows an application of the invention to a single cylinder motor, the corresponding details have the same reference numerals as in Fig. 1. Here, the connecting rod 6 is shown to be provided with roller bearings 34, and in the upper part of the crank 10 there is provided a recess 35 all around the crank shaft 12, said recess serving as a container for the lubricant descending from the upper crank shaft bearing 18. This lubricant is conducted to the roller bearing 34 through a passage 36 in the crank. The lubricant collecting in the channel 20 is forced, during the compression stroke, through the conduit 21 to the upper crank shaft bearing 18 and lubricates the latter, whence it escapes to the connecting rod bearing 34 through the recess 35 and the channel 36, while the lower crank shaft bearing 19 is lubricated by the lubricant collecting in the lower portion of the crank chamber 16. Through the arrangement of the non-return valve 24 provision is made for maintaining communication between the crank chamber and the upper crank shaft bearing only during the compression stroke of the piston 2, when a pressure above atmospheric is produced in the chamber 16, whereas said connection is interrupted during the suction stroke.

What I claim is:—

1. An internal combustion motor comprising in combination a vertical crank shaft, a closed crank casing subjected to periodic pressure pulsations above atmospheric pressure, an upper crank shaft bearing, a lower crank shaft bearing, and means for withdrawing lubricating oil from said crank casing at a point above said lower bearing and for subjecting the oil thus withdrawn to said pressure pulsations and thereby delivering the same to said upper bearing.

2. An internal combustion motor comprising in combination a vertical crank shaft, a closed crank casing, an upper crank shaft bearing, a lower crank shaft bearing, a lubricating conduit connected with said crank casing at a point above said lower bearing and with said upper bearing, and a non-return valve located in said lubricating conduit and adapted to open in the direction leading to said upper bearing.

3. An internal combustion motor comprising in combination a vertical crank shaft, a closed crank casing, an upper crank shaft bearing, a lower crank shaft bearing, an oil collector situated in said crank casing above said lower bearing, and a lubricating conduit connected with said oil collector and with said upper bearing.

4. An internal combustion motor comprising in combination a vertical crank shaft, a closed crank casing, an upper crank shaft bearing, a lower crank shaft bearing, an oil collector situated in said crank casing above said lower bearing, an oil conduit connected with said oil collector and with said upper bearing, and a non-return valve located in said oil conduit and adapted to open in the direction leading to said upper bearing.

5. An internal cumbustion motor comprising in combination a vertical crank shaft, a closed crank casing, an upper crank shaft bearing, a lower crank shaft bearing, a crank, a crank pin bearing, a channel in said upper bearing, a channel in said crank adapted to connect said channel in said upper bearing with said crank pin bearing, and an oil conduit connected with said crank casing at a point above said lower bearing and with said upper bearing.

6. An internal combustion motor comprising in combination a vertical crank shaft, a closed crank casing, an upper crank shaft bearing, a lower crank shaft bearing, a crank, a crank pin bearing, an annular channel in said upper bearing, a channel in said crank adapted to connect said annular channel with said crank pin bearing, an oil collector situated in said crank casing above said lower bearing, an oil conduit connected with said oil collector and with said upper bearing, and a non-return valve located in said oil conduit and adapted to open in the direction leading to said upper bearing.

7. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, and a lubricating conduit connected with said lower chamber at a point above said lower bearing and with said upper bearing.

8. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, a lubricating conduit connected with said lower chamber at a point above said lower bearing and with said upper bearing, and a non-return valve located in said lubricating conduit and adapted to open in the direction directly to said upper bearing.

9. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an oil collector situated in said lower chamber above said lower bearing, and a lubricating conduit connected with said oil collector and with said upper bearing.

10. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an oil collector situated in said lower chamber above said lower bearing, an oil conduit connected with said oil collector and with said upper bearing, and a non-return valve located in said oil conduit and adapted to open in the direction leading to said upper bearing.

11. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an upper crank pin bearing, a lower crank pin bearing, a channel in the upper crank adapted to connect said upper crank shaft bearing with said upper crank pin bearing, an oil conduit connected with said lower chamber at a point above said lower crank shaft bearing and with said upper crank shaft bearing, and a non-return valve situated in said oil conduit and adapted to open in the direction leading to said upper crank shaft bearing.

12. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an upper crank pin bearing, a lower crank pin bearing, a channel in the upper crank adapted to connect said upper crank shaft bearing with said upper crank pin bearing during that time of each revolution when a partial vacuum exists in said upper chamber, and an oil conduit connected with said lower chamber at a point above said lower crank shaft bearing and with said upper crank shaft bearing.

13. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an upper crank pin bearing, a lower crank pin bearing, an intermediate crank shaft bearing, a channel in the lower crank adapted to connect said intermediate crank shaft bearing with said lower crank pin bearing during that time of each revolution when a partial vacuum exists in said lower chamber, and an oil conduit connected with said lower chamber at a point above said lower crank shaft bearing and with said upper crank shaft bearing.

14. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an upper crank pin bearing, a lower crank pin bearing, an intermediate crank shaft bearing, a channel in the upper crank adapted to connect said upper crank shaft bearing with said upper crank pin bearing, a second channel in the lower crank adapted to connect said intermediate crank shaft bearing with said lower crank pin bearing during that time of each revolution when a partial vacuum exists in said lower chamber, an oil conduit connected with said lower chamber at a point above said lower crank shaft bearing, and a non-return valve situated in said oil conduit and adapted to open in the direction leading to said upper crank shaft bearing.

15. An internal combustion motor comprising in combination a vertical double throw crank shaft, a closed crank casing, a partition wall adapted to divide said crank casing into an upper chamber and a lower chamber, the upper crank being situated in said upper chamber and the lower crank in said lower chamber, an upper crank shaft bearing, a lower crank shaft bearing, an upper crank pin bearing, a lower crank pin bearing, an intermediate crank shaft bearing, a channel in the upper crank adapted to connect said upper crank shaft bearing with said upper crank pin bearing during that time of each revolution when a partial vacuum exists in said upper chamber, a second channel in the lower crank adapted to connect said intermediate crank shaft bearing with said lower crank pin bearing during that time of each revolution when a partial vacuum exists in said lower chamber, an oil collector situated in said lower chamber above said lower crank shaft bearing, an oil conduit connected with said oil collector and with said upper crank shaft bearing, and a non-return valve situated in said oil conduit and adapted to open in the direction leading to said upper crank shaft bearing.

CARL AXEL SKÄRLUND.